Patented June 5, 1945

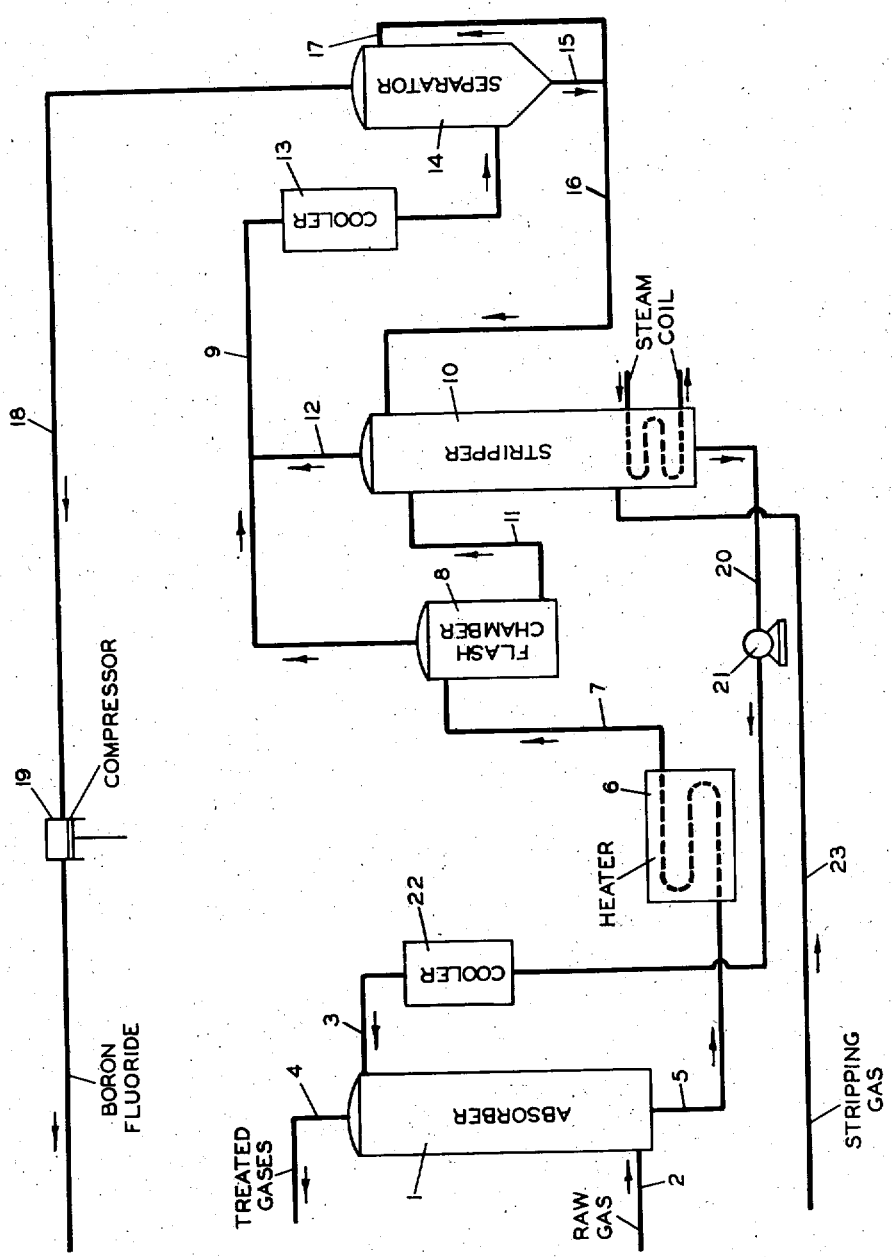

2,377,396

UNITED STATES PATENT OFFICE 2,377,396

PROCESS FOR RECOVERY OF BORON HALIDES

William Nelson Axe, Bartlesville, Okla., assignor to Phillips Petroleum Company, a corporation of Delaware Application March 26, 1943, Serial No. 480,697

13 Claims. (Cl. 23—205)

This invention relates to an improved method for the concentration and/or recovery of boron halides. More specifically it relates to the recovery of boron fluoride from normally gaseous hydrocarbons and mixtures of hydrocarbons and inert gases. One specific embodiment of this invention relates to an improved process for the selective absorption of boron fluoride from a hydrocarbon gas stream by means of an ether and subsequent recovery of substantially pure boron fluoride from the absorbent.

Recently it has been discovered that boron fluoride and particularly coordination compounds of boron fluoride possess unusual catalytic activity when applied to a wide variety of polymerization, isomerization and alkylation reactions. Even more recently it has been discovered that exceptional catalyst life in alkylation and other hydrocarbon conversion reactions can be realized by the continuous activation of boron fluoride complex compounds with gaseous boron fluoride. However, regardless of the mode of operation, where boron fluoride or its complex compounds are employed as catalysts, free boron fluoride will usually be found among the hydrocarbon reaction products. The recovery and reuse of boron fluoride, therefore, results in extraordinary economy of operation. Such a recovery process is of particular benefit where boron fluoride is employed as an activator in alkylation reactions leading to the production of high-octane blending agents for aviation fuels.

It has heretofore been proposed to effect the removal of boron fluoride from gaseous or liquid hydrocarbon streams by means of aqueous alkaline solutions and the like. However, because of its high degree of activity, the recovery of boron fluoride, as such, from the products of such chemical reactions is a difficult problem. It has also been proposed, for example, to employ ammonia and amines as agents for the extraction of boron fluoride. However, the reaction product of ammonia and boron fluoride that is formed in such a process is an exceedingly stable compound requiring a drastic chemical reaction for liberation of the combined boron fluoride. The disadvantages of such a boron fluoride recovery process are apparent on consideration of the unit operations involved when aqueous ammonia is employed as the absorbent: (1) concentration of the wash-solution to effect precipitation of $NH_3.BF_3$; (2) filtration; (3) reduction of the water content of the precipitate to bone-dry conditions; (4) decomposition of $NH_3·BF_3$ with 100 per cent sulfuric acid at a temperature of about 410° F.; (5) disposal of spent acid and by-product salts. Other recovery methods have been proposed which also involve the formation of stable compounds and are objectionable for the reasons hereinbefore presented.

The principal object of the present invention is to provide a process for the efficient and economical removal of boron fluoride from gaseous or liquid hydrocarbon mixtures which include such other components as methane, ethane, propane, and fixed gases. Another object of this invention is to provide a process whereby boron fluoride can be recovered continuously from hydrocarbon streams flowing from reactions of the type described and can be recovered and returned to the reaction zone without appreciable loss or without appreciable consumption of other chemicals. These and other objects, some of which are referred to specifically hereinafter, will be apparent to those skilled in the art.

I have discovered that the removal of boron fluoride from hydrocarbon and other gas mixtures can be effected by treatment of such gases with an absorbent liquid comprising an organic ether of a particular type. While the process of the present invention is not limited thereto, the unusual capacity of the preferred absorbents is ordinarily considered to be due to the formation of complex compounds or addition compounds by interaction of boron fluoride with the ether, under conditions which provide for highly efficient and economical operation.

I have further discovered that, in certain instances, the complex compounds thus formed are substantially completely decomposed at elevated temperatures. While complex compounds of boron fluoride and ethers in general are relatively stable at normal temperatures, decomposition by heating at elevated temperatures results in the evolution of boron fluoride from certain of the complex compounds more readily than from others. This characteristic of certain of the compounds of boron fluoride and ethers is utilized as described hereinafter to recover the original constituent compounds for reuse in the respective process operations.

The organic ethers for use according to the process of this invention may be selected from the group corresponding to the type formula

where X is an alkyl radical with or without substituents other than hydrogen and Y is either an alkyl or an aryl radical, also with or without substituents other than hydrogen. Substituents other than hydrogen which may be present in the ethers include such unreactive groups as halogens, specifically fluorine, chlorine, bromine and iodine; alkoxy radicals such as methoxy, ethoxy, etc.; and esterified carboxyl radicals such as —$COOC_2H_5$, etc. The basis of selection of ethers for use according to the present invention is referred to hereinafter.

The relative stability of complex compounds of boron fluoride and ethers has been found to vary with the size and structure of the hydrocarbon radicals of the ether molecule, as well as with the substituents of said radicals. Thus, for example, the unsubstituted lower members of the homologous dialkyl ether series, dimethyl and diethyl ether, form stable complex compounds with boron fluoride which may be distilled without decomposition, and which are not particularly well suited to the recovery of boron fluoride by thermal means. However, 2,2'-dichlorodiethyl ether (known to the trade as "chlorex") forms a less thermally stable complex from which boron fluoride is relatively easily recovered. I have also found that dibutyl ether and higher aliphatic ethers form less stable complex compounds which are much more susceptible to thermal decomposition. However, the thermal decomposition of complex compounds of higher aliphatic ethers and boron fluoride often results in side reactions which form polymers or otherwise destroy the ethers.

Furthermore, I have discovered that the absorbing capacity for boron fluoride of diaryl ethers such as diphenyl ether is often much below that of the aliphatic compounds, presumably because of the reduced tendency toward the formation of complex compounds with boron fluoride under conditions normally essential to the hereinafter described process.

In the case of mixed aromatic-aliphatic ethers (where X of the general formula is an aliphatic and Y is an aromatic radical) such as anisole (phenyl methyl ether), I have obtained absorption of boron fluoride corresponding to the formation of complex compounds containing approximately one mol of boron fluoride per mol of the ether. These complex compounds are relatively stable at moderate temperatures, but may be decomposed with recovery of boron fluoride by the simple application of heat and/or reduction of pressure. Ordinarily a high degree of dissociation into boron fluoride and the ether is realized at temperatures of approximately 150° to approximately 350° F., although variations from and within these limits may occur, depending on the particular mixed ether employed, the pressure and the degree of saturation of the absorbent liquid with respect to boron fluoride.

The process of this invention for the recovery of boron fluoride is particularly applicable to hydrocarbon conversion processes in which boron fluoride, boron fluoride complex compounds or combinations of a complex and free boron fluoride are employed as catalysts, for example, in hydrocarbon alkylation processes. In such instances, the effluent hydrocarbon stream from the alkylation reaction zone may contain quantities of boron fluoride which it is desirable to remove and/or recover for further use in the process. The quantities involved may vary, dependent on the catalyst composition and the reaction conditions. In plant operation, appreciable quantities of methane, ethane and propane may be included in the hydrocarbon feed stocks or reaction products and therefore may have to be removed from the reactor effluent. Since boron fluoride has a boiling point between that of methane and that of ethane, one specific embodiment of the present process comprises operation of a stabilizer or fractionator so that fixed gases, $C_3$ and lighter hydrocarbons, and boron fluoride may be conveniently removed in one operation, thus leaving the $C_4$ and heavier hydrocarbon material substantially free of boron fluoride. The overhead light gases may then be contacted in a suitable countercurrent operation with a selected ether to remove boron fluoride. When boron fluoride recovery is practiced, the absorption liquor is stripped of its boron fluoride in a column operated at a temperature level sufficient to effect decomposition of the boron fluoride complex at a satisfactory rate. The gaseous boron fluoride is then compressed and returned to the alkylation system.

A specific embodiment of the boron fluoride recovery process is illustrated in the accompanying drawing which is a flow diagram which shows an arrangement of process equipment or apparatus for the continuous recovery of boron fluoride from a gas stream containing $C_3$ and lighter hydrocarbons and/or fixed gases. The raw gas may be the overhead stream from a depropanizing column of an alkylation plant or other hydrocarbon conversion process. Such a raw gas enters the absorber 1 through line 2 at a pressure substantially the same as that maintained in the stabilizing column, which may be operated at pressures from about atmospheric to 500 pounds per square inch gage or more depending on the composition of the gas. The raw gas is intimately contacted in a countercurrent operation with the mixed aromatic-aliphatic ether such as anisole entering through the conduit 3 at the top of the absorber. The treated gas, free of boron fluoride, is vented through conduit or line 4. The boron fluoride-ether complex along with excess ether passes through line 5 and heater 6 and thence through line 7 and a pressure reducer (not shown) into flash chamber 8. The combined effect of the increased temperature and reduction in pressure may result in the liberation of part of the combined boron fluoride which passes out of the flash chamber through line 9. The ether-boron fluoride liquor is next pumped to a conventional stripping column 10 through line 11. Sufficient heat is applied at the bottom of the column to effect further decomposition of the boron fluoride-ether addition compound. The evolved boron fluoride leaves the stripper via conduits or lines 12 and 9. After passing through cooler 13 the boron fluoride and entrained ether enter the bottom of separator 14. At the lower temperatures prevailing in separator 14, the entrained ether may combine with boron fluoride to form a liquid complex compound which drains from the bottom of the separator through conduit 15. The liquid separated from the gas stream may be returned to the top of the stripping column through conduit 16, or a portion may be pumped to the top of the separator through line 17 to aid in the separation of the last traces of entrained absorbent. The boron fluoride is conducted from the separator through line 18 to compressor 19 and thence to storage. The stripped absorbent is pumped from the bottom of the stripping column through line 20 and pump 21 to cooler 22 and back through conduit 3 to the absorber 1.

An alternative mode of operation with respect to the stripping step can be advantageously employed in connection with processes wherein boron fluoride is recycled in a hydrocarbon vapor or liquid stream, e. g., as in the alkylation of isobutane. The recovered boron fluoride may be fed to the alkylation reactor in the isobutane stream, and isobutane may be employed to aid in stripping boron fluoride from the ether complex.

In accordance with this alternative mode of operation, referring to the accompanying drawing, the raw gas, which comprises boron fluoride and isobutane, is introduced to the absorber 1 through line 2. The separated isobutane is discharged through line 4 and may be returned to the alkylation reactor in the isobutane stream thereof or may be used as stripping gas in stripper 10 by charging it to line 23. The boron fluoride absorbed in the ether in absorber 1 is passed through line 5 to heater 6. From heater 6 the material is passed through line 7 to flash chamber 8. Liberated boron fluoride passes out through line 9 as before and the ether-boron fluoride liquor is pumped to stripping column 10 through line 11. Stripping gas, which is isobutane from line 4 or from an external source, is introduced to the bottom of stripper 10 through line 23. Boron fluoride together with isobutane that was used in the stripping operation is discharged from stripper 10 through lines 12 and 9 and passes through cooler 13 and separator 14. A considerable reduction in the operating temperature may be realized by the use of isobutane as a stripping agent in accordance with this modification. The remainder of the operation remains unchanged. After passing through compressor 19, the recycle mixture of hydrocarbon (isobutane) and boron fluoride is returned directly to the alkylation reaction zone.

The preferred absorbents for use according to the process of the invention are 2,2'-dichlorodiethyl ether and mixed aromatic-aliphatic ethers such as anisole (phenyl methyl ether), phenetole (phenyl ethyl ether), tolyl methyl ethers, tolyl ethyl ethers, and the methyl and ethyl ethers of the isomeric xylenols. In general it is preferred to employ only such mixed ethers in which the aliphatic radical contains not more than about 6 carbon atoms since there may be some tendency toward decomposition of the ether in the presence of boron fluoride where longer aliphatic chains are involved. In those instances where the aliphatic radical contains not more than about 3 carbon atoms, mixtures of the ether and ether-boron fluoride complex can usually be heated to or above the boiling point of the ether without encountering undesirable decomposition or polymerization reactions.

Although it is advantageous to operate the recovery process of this invention with relatively pure compounds, mixtures of ethers, such as those prepared from commercial cresols and xylenols, may be satisfactorily employed. While the absorbents may contain relatively inert impurities or diluents it is usually preferred to employ mixtures relatively free of phenolic or alcoholic impurities.

In the operation of this process, complete saturation of the selected ether with boron fluoride is not necessary and in many instances may be undesirable. The degree of saturation of the absorber effluent usually depends on the partial pressure of boron fluoride in the gas stream being treated and the vapor pressure of the solution of boron fluoride-ether complex in the ether absorbent. The specific operating concentrations for any particular application may be chosen to conform to efficient absorption practice in view of the pressure, temperature and boron fluoride content of the gas stream undergoing treatment.

Absorber pressures are preferably chosen in accordance with the composition of the raw gas stream, especially with respect to its boron fluoride content. Pressures in the neighborhood of 150 pounds per square inch gage are generally adequate for efficient operation even with very lean gases. If the raw gas is rich in methane and ethane, absorber pressures as high as 500 pounds per square inch may be employed. In order to prevent excessive accumulation of hydrocarbons in the absorbent, gas-liquid contacting is preferred and pressures are regulated to maintain this condition.

In the absorption step of this process, moderate or subatmospheric temperatures are employed since formation of the ether-boron fluoride complex compound is favored at such temperatures. Dissociation of the complex compounds at atmospheric pressure sets in rapidly above approximately 120° F. The preferred operating range for absorption is preferably between approximately 50° and approximately 110° F., although lower temperatures are operative and higher temperatures may be employed at higher absorbing pressures.

In the stripping zone, low superatmospheric to atmospheric pressure is preferred since decomposition of the ether-boron fluoride complex can be effected at moderately elevated temperatures at such pressures. In most instances desorption or dissociation of the boron fluoride at these pressures is complete at temperatures below approximately 350° F. The maximum temperature required depends on the absorbent used, the pressure, and the mode of operation, i. e., gas stripping or other desorption aids in the stripping zone.

It is not intended that the present invention be limited to any specific theories of operation nor to the absorbents or conditions of specific examples which are presented for the purpose of illustration.

*Example I*

A $C_2$—$C_3$ gas mixture containing 10 mol per cent of boron fluoride was passed through an absorption tower in which various ethers were used as absorbents until the ether was completely saturated. The absorption conditions were atmospheric temperature and pressure. The weight of boron fluoride absorbed was obtained from the increase in weight of the absorbent. The saturated absorbent was then heated to temperatures below 350° F. and the evolution of boron fluoride was determined by the loss in weight. Results are listed in the following table.

| Ether | $BF_3$/ether mol ratio | $BF_3$ recovery |
| --- | --- | --- |
| Dimethyl | 1 (approx.) | None (distilled without decomposition). |
| Diethyl | 1 (approx.) | Do. |
| Dibutyl | 1 (approx.) | Partial (polymer formation). |
| Diphenyl | Very slight absorption at specified conditions. | |
| 2,2'-dichlorodiethyl | 1 | Complete. |
| Phenyl methyl (anisole) | 1 | Do. |
| Phenyl ethyl (phenetole) | 1 | Do. |

Example II

In isobutane-ethylene alkylation over

catalyst composition, the catalyst is continuously activated by BF₃ addition in the isobutane feed. The reactor effluent is depropanized, removing C₃ and lighter hydrocarbons and BF₃ from the C₄ and heavier products. Boron fluoride is removed from the light gas stream by contact with anisole (phenyl methyl ether) at 80° to 100° F. and a gage pressure of 150 pounds per square inch. The BF₃ is recovered in substantially pure form for recycling by heating and stripping the rich absorbent at 180–200° F. and 15 pounds gage pressure.

Example III

Results similar to those obtained in Example II are obtained when phenetole (phenyl ethyl ether) is substituted for anisole in the process described in Example II.

Example IV

When 2,2'-dichlorodiethyl ether is substituted for anisole in the process of Example II, similar results are obtained.

Although the invention is particularly applicable to the separation and recovery of boron fluoride from gaseous mixtures it may also be used for the separation of boron chloride or other boron halides from such mixtures when present alone or in admixture with boron fluoride.

Inasmuch as the foregoing description comprises preferred embodiments of the invention it is to be understood that the invention is not limited thereto and that changes and modifications may be made therein in manners known to the art without departing from the invention or the scope of the appended claims. The invention is to be limited only as defined in the appended claims.

I claim:

1. A process for the separation and recovery of a boron halide from fluid mixtures containing the same, which comprises contacting said fluid mixture with a liquid absorbent comprising an organic ether which forms a complex or addition compound with the boron halide that decomposes substantially completely at a higher temperature but below approximately 350° F. into its constituent compounds, separating unabsorbed fluid from said liquid absorbent, and heating the liquid absorbent containing said complex or addition compound to liberate the boron halide.

2. A process for the separation and recovery of boron fluoride from a gaseous mixture containing the same, which comprises contacting said gaseous mixture with a liquid absorbent comprising an organic ether which forms a complex or addition compound with boron fluoride that decomposes substantially completely at a higher temperature but below approximately 350° F. into its constituent compounds, separating unabsorbed gases from said liquid absorbent, and heating the liquid absorbent containing said complex or addition compound to liberate boron fluoride.

3. A process for the separation and recovery of a boron halide from a hydrocarbon stream, which comprises contacting said hydrocarbon stream with a liquid absorbent comprising an organic ether which forms a complex or addition compound with the boron halide that decomposes substantially completely at a higher temperature but below approximately 350° F. into its constituent compounds and having general formula, X—O—Y, in which X is a radical selected from the group consisting of alkyl, halogen-substituted alkyl, alkoxy-substituted alkyl and esterified carboxyl-substituted alkyl radicals, and Y is a radical selected from the group consisting of alkyl, halogen-substituted alkyl, alkoxy-substituted alkyl, esterified carboxyl-substituted alkyl, aryl, halogen-substituted aryl, alkoxy-substituted aryl and esterified carboxyl-substituted aryl radicals, separating unabsorbed fluid from said complex or addition compound and heating said complex or addition compound to liberate the boron halide.

4. A process according to claim 3 in which the boron halide is boron fluoride.

5. A process for the separation and recovery of boron fluoride from a gaseous mixture containing the same, which comprises contacting said gaseous mixture with a liquid absorbent comprising a mixed aromatic aliphatic ether which forms a complex or addition compound with boron fluoride that decomposes substantially completely at a higher temperature but below approximately 350° F. into its constituent compounds and in which the alkyl group contains not more than 6 carbon atoms, separating unabsorbed gases from said liquid absorbent, and heating the liquid absorbent containing absorbed boron fluoride to liberate boron fluoride.

6. A process as defined in claim 5 and further characterized in that the absorption is conducted at a temperature within the range of 50° to 110° F. and at a pressure not in excess of 500 pounds per square inch, and the heating of the liquid absorbent containing absorbed boron fluoride is conducted at a temperature not substantially above approximately 350° F.

7. A process for the separation and recovery of boron fluoride from a gaseous mixture, which comprises contacting said gaseous mixture with a liquid absorbent comprising 2,2'-dichlorodiethyl ether, separating unabsorbed gases from said liquid absorbent, and heating the liquid absorbent containing absorbed boron fluoride to liberate boron fluoride.

8. A process as defined in claim 7 and further characterized in that the absorption is conducted at a temperature within the range of 50° to 110° F. and at a pressure not in excess of 500 pounds per square inch, and the heating of the liquid absorbent containing absorbed boron fluoride is conducted at a temperature not substantially above approximately 350° F.

9. A process for the separation and recovery of boron fluoride from a gaseous mixture, which comprises contacting said gaseous mixture with a liquid absorbent comprising anisole, separating unabsorbed gases from said liquid absorbent, and heating the liquid absorbent containing boron fluoride to liberate boron fluoride.

10. A process as defined in claim 9 and further characterized in that the absorption is conducted at a temperature within the range of 50° to 110° F. and at a pressure not in excess of 500 pounds per square inch, and the heating of the liquid absorbent containing absorbed boron fluoride is conducted at a temperature not substantially above approximately 350° F.

11. A process for the separation and recovery of boron fluoride from a gaseous mixture, which comprises contacting said gaseous mixture with a liquid absorbent comprising phenetole, separating unabsorbed gases from said liquid absorbent, and heating the liquid absorbent containing absorbed boron fluoride to liberate boron fluoride.

12. A process as defined in claim 11 and further characterized in that the absorption is conducted at a temperature within the range of 50° to 110° F. and at a pressure not in excess of 500 pounds per square inch, and the heating of the liquid absorbent containing absorbed boron fluoride is conducted at a temperature not substantially above approximately 350° F.

13. A process for the separation and recovery of boron fluoride from a gaseous mixture containing the same, which comprises contacting said gaseous mixture with a liquid absorbent comprising a mixed aromatic-aliphatic ether which forms a complex or addition compound with boron fluoride that decomposes substantially completely at a higher temperature but below approximately 350° F. into its constituent compounds and in which the alkyl group contains not more than 6 carbon atoms, separating unabsorbed gases from said liquid absorbent, and stripping boron fluoride from the liquid absorbent containing the same by passing a stripping agent consisting essentially of isobutane through the liquid absorbent at an elevated temperature.

WILLIAM NELSON AXE.

CERTIFICATE OF CORRECTION.

Patent No. 2,377,396. June 5, 1945.

WILLIAM NELSON AXE.

It is hereby certified that error appears in the printed specification of the above numbered patent requiring correction as follows: Page 2, first column, line 42, after the word "aliphatic" insert --radical--; page 3, first column, line 72, for "affluent" read --effluent--; and that the said Letters Patent should be read with this correction therein that the same may conform to the record of the case in the Patent Office.

Signed and sealed this 25th day of September, A. D. 1945.

Leslie Frazer (Seal) First Assistant Commissioner of Patents.

and heating the liquid absorbent containing absorbed boron fluoride to liberate boron fluoride.

12. A process as defined in claim 11 and further characterized in that the absorption is conducted at a temperature within the range of 50° to 110° F. and at a pressure not in excess of 500 pounds per square inch, and the heating of the liquid absorbent containing absorbed boron fluoride is conducted at a temperature not substantially above approximately 350° F.

13. A process for the separation and recovery of boron fluoride from a gaseous mixture containing the same, which comprises contacting said gaseous mixture with a liquid absorbent comprising a mixed aromatic-aliphatic ether which forms a complex or addition compound with boron fluoride that decomposes substantially completely at a higher temperature but below approximately 350° F. into its constituent compounds and in which the alkyl group contains not more than 6 carbon atoms, separating unabsorbed gases from said liquid absorbent, and stripping boron fluoride from the liquid absorbent containing the same by passing a stripping agent consisting essentially of isobutane through the liquid absorbent at an elevated temperature.

WILLIAM NELSON AXE.

CERTIFICATE OF CORRECTION.

Patent No. 2,377,396.     June 5, 1945.

WILLIAM NELSON AXE.

It is hereby certified that error appears in the printed specification of the above numbered patent requiring correction as follows: Page 2, first column, line 42, after the word "aliphatic" insert --radical--; page 3, first column, line 72, for "affluent" read --effluent--; and that the said Letters Patent should be read with this correction therein that the same may conform to the record of the case in the Patent Office.

Signed and sealed this 25th day of September, A. D. 1945.

Leslie Frazer (Seal)     First Assistant Commissioner of Patents.